United States Patent
Ihn et al.

(10) Patent No.: US 10,210,740 B2
(45) Date of Patent: Feb. 19, 2019

(54) SYSTEM AND METHOD FOR MONITORING STRUCTURAL HEALTH OF BONDED COMPONENTS

(71) Applicants: The Boeing Company, Chicago, IL (US); Keeyoung Choi, Incheon (KR)

(72) Inventors: Jeong-Beom Ihn, Bellevue, WA (US); Keeyoung Choi, Incheon (KR)

(73) Assignee: The Boeing Company, Chicago, IL (US)

( * ) Notice: Subject to any disclaimer, the term of this patent is extended or adjusted under 35 U.S.C. 154(b) by 316 days.

(21) Appl. No.: 14/935,887

(22) Filed: Nov. 9, 2015

(65) Prior Publication Data

US 2017/0132901 A1    May 11, 2017

(51) Int. Cl.
*G08B 21/18* (2006.01)
*G01M 5/00* (2006.01)
*G08B 5/00* (2006.01)

(52) U.S. Cl.
CPC .......... *G08B 21/18* (2013.01); *G01M 5/0016* (2013.01); *G01M 5/0033* (2013.01); *G01M 5/0083* (2013.01); *G08B 5/00* (2013.01)

(58) Field of Classification Search
None
See application file for complete search history.

(56) References Cited

U.S. PATENT DOCUMENTS

2007/0100582 A1* 5/2007 Griess ................. G01M 5/0033
   702/183
2007/0289356 A1   12/2007 Konzelmann et al.
(Continued)

FOREIGN PATENT DOCUMENTS

| WO | 2007085070 | 8/2007 |
|----|------------|--------|
| WO | 2010097095 | 9/2010 |
| WO | 2012048237 | 4/2012 |

OTHER PUBLICATIONS

Galea, et al., "Development of Structural Health Monitoring Systems for Composite Bonded Repairs on Aircraft Structures," Proceedings of SPIE, 2001, pp. 246-257, vol. 4327.
(Continued)

*Primary Examiner* — Nay Tun
*Assistant Examiner* — Shawna M Kingston
(74) *Attorney, Agent, or Firm* — Kunzler, PC (57) ABSTRACT

The present disclosure relates to a system for monitoring structural health of bonded components includes an energy-harvesting device. The system also includes a damage-detection module powered by electrical energy from the energy-harvesting device. Further, the system includes electrically-conductive ink applied onto the bonded components and across an interface between the bonded components. The electrically-conductive ink forms an electrical circuit with the damage-detection module. Additionally, the system includes a visual-indication device electrically coupled with the damage-detection module. The visual-indication device is configured to visually indicate damage to the bonded components in response to receipt of electrical energy. The damage-detection module is configured to detect a break in the electrically-conductive ink and to transmit electrical energy from the energy-harvesting device to the visual-indication device in response to detecting the break in the electrically-conductive ink.

19 Claims, 6 Drawing Sheets

(56) References Cited

U.S. PATENT DOCUMENTS

| | | |
|---|---|---|
| 2011/0018686 A1 | 1/2011 | Fahley et al. |
| 2011/0095772 A1 | 4/2011 | Sidhu et al. |
| 2012/0265449 A1 | 10/2012 | Ihn et al. |
| 2013/0132032 A1* | 5/2013 | McKeown .......... G01M 5/0041 702/182 |

OTHER PUBLICATIONS

Extended European Search Report for European Patent Application No. 16197572.7 dated Feb. 22, 2017.

* cited by examiner

SYSTEM AND METHOD FOR MONITORING STRUCTURAL HEALTH OF BONDED COMPONENTS

FIELD

This disclosure relates generally to monitoring the structural health of a bonded joint, and relates more particularly to a system and method for in situ monitoring of bonded joints using harvested energy, short-circuit detection, and dedicated visual identification.

BACKGROUND

Joining components together is a step in many manufacturing and repair processes for larger assemblies and structures. Moreover, many devices and methods exist for joining components together. The term "joint" refers to the point, line, or space between at least two components coupled together, and the localized portions of the two components adjacent the point, line, or space. A joint can be formed between components using any of various fastening techniques, interlocking techniques, welding techniques, and/or bonding techniques. A joint formed using bonding techniques is termed a bonded joint.

Conventionally, the strength or structural health of a joint is determined by testing or visually observing the joint. Generally, strength tests are performed ex situ and usually involve the application of shear, compression, and/or tensile type forces to the joint. For example, conventional test methods of bonded joints may require removal of the joint from its operational position on a structure, thus requiring considerable expense and time. Typical visual observation techniques of joints for damage can be difficult. Such visual observation techniques often require close inspection, which is usually performed by manual observation.

Whether the components are bonded together as a step in an original manufacture of a structure or bonded together to repair a damaged portion of a structure, over time, in certain operating conditions, the bonded joint between bonded components may breakdown. For example, the bonding material forming the bonded joint between bonded components may become debonded from one or more of the bonded components. Such a condition is known as delamination or debonding and results in the bonding material breaking away from one or more of the bonded components. Delamination occurs along the interface between bonded components or along an edge between bonded components, and results in either the bonding material separating from one or more of the bonded components, or one of the bonded components separating from at least one of the other of the bonded components. Delamination of a bonded joint can have negative consequences on the performance and integrity of the bonded joint, the bonded components, and the overall structure of which the bonded components form a part.

SUMMARY

The subject matter of the present disclosure has been developed in response to the present state of the art, and in particular, in response to the limitations of conventional joint testing systems. Specifically, conventional joint testing methods and systems do not allow for joints to be tested and monitored in situ or while a structure is in use. Accordingly, the subject matter of the present disclosure has been developed to provide a system and method for monitoring structural health of bonded components in situ that overcome at least some of the above-discussed shortcomings of the prior art.

According to one embodiment, a system for monitoring structural health of bonded components includes an energy-harvesting device configured to convert non-electrical energy into electrical energy. The system also includes a damage-detection module powered by electrical energy from the energy-harvesting device. Further, the system includes electrically-conductive ink applied onto the bonded components and across an interface between the bonded components. The electrically-conductive ink forms an electrical circuit with the damage-detection module. Additionally, the system includes a visual-indication device electrically coupled with the damage-detection module. The visual-indication device is configured to visually indicate damage to the bonded components in response to receipt of electrical energy. The damage-detection module is configured to detect a break in the electrically-conductive ink and to transmit electrical energy from the energy-harvesting device to the visual-indication device in response to detecting the break in the electrically-conductive ink.

In some implementations of the system, the energy-harvesting device, damage-detection module, and visual-indication device are affixed to at least one of the bonded components. The energy-harvesting device, damage-detection module, and visual-indication device can be integrated into at least one of the bonded components. The energy-harvesting device, damage-detection module, and visual-indication device can be permanently coupled to at least one of the bonded components.

According to certain implementations of the system, the non-electrical energy includes kinetic energy. The energy-harvesting device can include a piezoelectric generator.

In certain implementations of the system, the visual-indication device generates a permanent visual indication of damage to the bonded components. The visual-indication device can include a thermochromic marker.

According to some implementations of the system, the damage-detection module includes a switch component configured to transmit electrical energy from the energy-harvesting device to only the electrically-conductive ink when a break in the electrically-conductive ink is not detected and to transmit electrical energy from the energy-harvesting device to only the visual-indication device when a break in the electrically-conductive ink is detected. The switch component can include a passive switch component. Alternatively, or additionally, the switch component can include a transistor.

In some implementations of the system, the electrically-conductive ink zig-zags across the interface about a periphery of the interface. The electrically-conductive ink may follow a pattern comprising multiple passes across the interface about a periphery of the interface.

According to certain implementations of the system, a visual indication of damage to the bonded components provided by the visual-indication device is visible only in non-ambient lighting conditions.

In certain implementations of the system, the interface includes a bonding material.

According to another embodiment, a structure includes a substrate comprising a damaged portion and a patch applied to the damaged portion of the substrate. An interface is defined between the substrate and the patch. The structure also includes an energy-harvesting device affixed to the substrate and configured to convert non-electrical energy into electrical energy. Further, the structure includes a damage-detection module affixed to the substrate and powered by electrical energy from the energy-harvesting device. The structure additionally includes electrically-conductive ink applied onto the substrate, onto the patch, and across the interface. The electrically-conductive ink forms an electrical circuit with the damage-detection module. Also, the structure includes a visual-indication device electrically coupled with the damage-detection module and spaced away from the electrically-conductive ink. The visual-indication device is configured to visually indicate damage to the interface in response to receipt of electrical energy. The damage-detection module is configured to detect a break in the electrically-conductive ink and to transmit electrical energy from the energy-harvesting device to the visual-indication device in response to detecting the break in the electrically-conductive ink.

In some implementations of the structure, the visual-indication device is affixed to the substrate. The structure includes or can be an aircraft. The substrate may form a portion of the aircraft.

According to yet another embodiment, a method of monitoring structural health of bonded components includes applying electrically-conductive ink onto bonded components and across an interface between the bonded components to form an electrical circuit. The method further includes converting non-electrical energy into electrical energy, and transmitting the electrical energy through the electrical circuit. Additionally, the method includes detecting a break in the electrically-conductive ink. The method also includes visually indicating a break in the electrically-conductive ink on a visual-indication device, powered by the electrical energy, in response to a break in the electrically-conductive ink being detected.

In some implementations of the method, applying the electrically-conductive ink onto the bonded components and across the interface between the bonded components to form the electrical circuit includes applying multiple passes of electrically-conductive ink across the interface about a periphery of the interface. Applying multiple passes of electrically-conductive ink can include applying multiple passes each having an least one of a square, triangular, or sinusoidal shape. Moreover, converting non-electrical energy into electrical energy may include converting kinetic energy into electrical energy using at least one piezoelectric generator.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

As described above, there are different methods for coupling two or more elements together. The present disclosure relates to permanently bonding components together with an adhesive composition ("bonded joint") and further relates to monitoring the structural health of bonded components, such as the bonded joints or interfaces between at least two components. There are many mechanical structures that may use bonded joints for permanently coupling components together during the original manufacturing or repair of such structures. For example, in the aerospace industry, bonded joints may be implemented throughout the frame, substructure, and exterior paneling of aircraft to hold various elements together. In aerospace applications, the bonded joints often must withstand harsh temperatures, pressures, humidity ranges, weather conditions, and/or other environmental situations. Additionally, the bonded joints must withstand the repeated and substantial load involved with frequent use, such as daily flying in the case of commercial aircraft.

Figure 1:
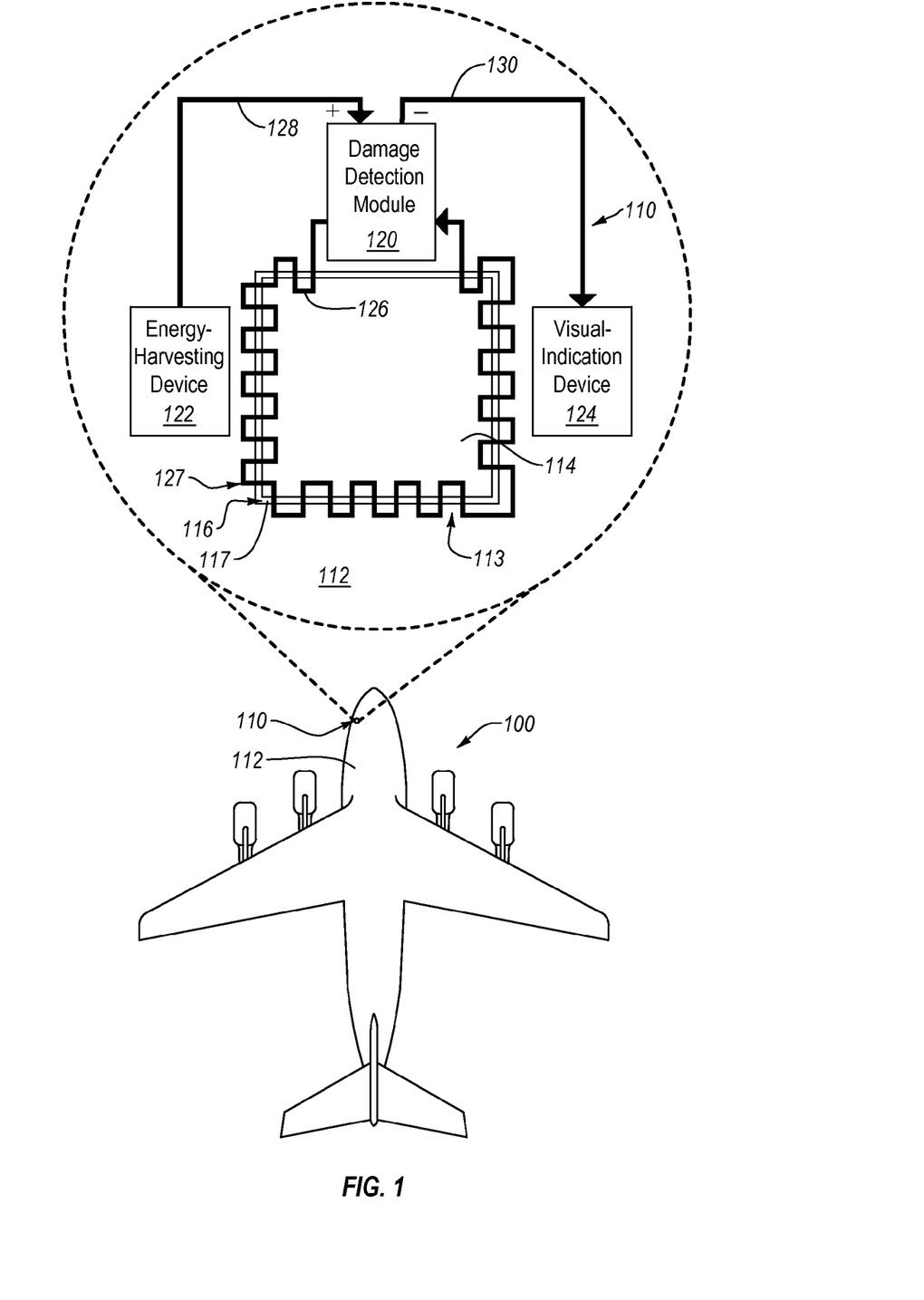
FIG. 1 depicts a top plane view of a structure with a system for monitoring structural health of bonded components, shown in a first state, according to one embodiment.

FIG. 1 depicts one embodiment of an aircraft 100 having a system 110 for monitoring structural health of bonded components of the aircraft 100. The aircraft 100 includes a component 112 that defines the structure of the aircraft. The component 112 can be any one of a plurality of components, such as interior/exterior panels, skins, substrates, frames, and/or substructures of a body (e.g., fuselage), wings, vertical stabilizer, horizontal stabilizers, engine housings, and/or the like, of the aircraft 100. In the illustrated embodiment, the component 112 being referenced is an exterior panel of the body of the aircraft 100. However, in other embodiments, the component 112 can be any other structural component of the aircraft 100. Although the structure shown in FIG. 1 is an aircraft 100, the principles of the present disclosure can be applied to any structure, such as spacecraft, automobiles, watercraft, buildings, bridges, and the like, without departing from the essence of the present disclosure. As will be described in more detail below, the system 110 is coupled to the structure while the structure is fully operational. In other words, the system 110 remains in situ on the structure as the system monitors the structural health of bonded components of the structure while the structure is in operation.

The component 112 can be permanently bonded to another component of the aircraft 100 via a bonded joint to form bonded components. The bonded joint is formed by an adhesive, epoxy, weldment, or other bonding material interposed between at least two components to permanently fix the components relative to each other. An interface is defined between the two bonded components. The interface between two bonded components can be considered as the direct contact or indirect contact (e.g., via a space or bonding material) between the bonded components. For example, in some embodiments, first portions of the bonded components can be bonded together with a bonding material, while second portions of the bonded components are directly in contact with each other without a bonding material between them. In such an example, there are two types of interfaces between the two bonded components, which are the bonding material between the first portions of the bonded components and the direct contact between the second portions of the bonded components. In other words, bonding material need not be interposed between adjacent portions of bonded components for an interface to be defined between the adjacent portions of the bonded components.

Figure 3:
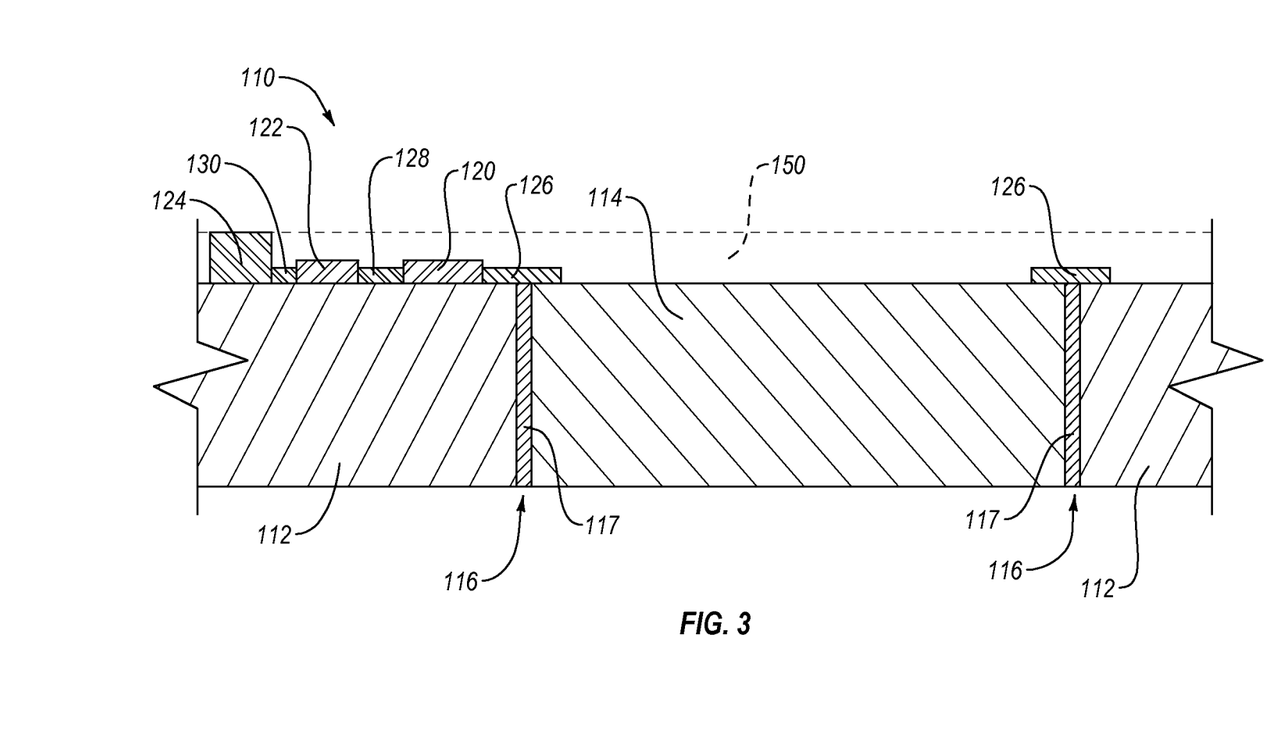
FIG. 3 depicts a cross-sectional side view of a system for monitoring structural health of bonded components, shown in a first state, according to one embodiment.

In the illustrated embodiment, particularly with reference to FIGS. 1 and 3, the component 112 is permanently fixed to a component 114 via a bonded joint formed by a bonding material 117 interposed between the components 112, 114. An interface 116 is defined between the component 112 and the component 114. As illustrated, the interface 116 between the two bonded components 112, 114 is defined by the bonding material 117 interposed between the two bonded components. However, as described above, in other embodiments, the interface between the two bonded components 112, 114 may not be defined by the bonding material 117, but rather may be defined by a space or direct contact between the bonded components. The type of bonded joint depicted in FIGS. 1 and 3 is a butt joint that couples the bonded components 112, 114 together at the tips or ends of the components. However, in other examples, different types of bonded joints can be used to permanently fix together the bonded components.

The component 114 can be any of various components as described above. However, in one embodiment, the component 114 is a patch that effectively repairs a damaged portion 113, or otherwise unsuitable portion, of the component 112. Accordingly, the component 114 is configured to replace a smaller portion of the component 112. Generally, in one embodiment, the damaged portion 113 is formed by removing a damaged section (not shown) of the component 112 from the component 112. In other words, the damaged portion 113 is the void in the component 112 created after the damaged section is removed. The component 114, or patch, is then positioned within the void of the damaged portion 113 to effectively replace the damaged section removed from the component 112. To permanently fix the component 114 within the damaged portion 113 of the component 112, the component 114 is bonded to the component 112 by applying the bonding material 117 between the components 112, 114. Although not necessary, in certain implementations, the component 114 is positioned within the damaged portion 113 of and bonded to the component 112 such that the component 114 is flush with the component 112. Further, one or more coatings and/or surface finishes may be applied to the component 114 to match the coating and/or surface finishes applied to the component 112. For example, one or more layers of paint may be applied to the surface of the component 114.

The components 112, 114 can be made from any of various materials, such as metals, composites, ceramics, plastics, and the like, known in the art. Similarly, the bonding material 117 can be any of various bonding materials, such as epoxy adhesives, polyamide adhesives, bismaleimide adhesives, thermoplastic adhesives, thermoset adhesives, and the like, known in the art. Generally, the bonding material 117 is selected according to its ability to bond with the material of the components 112, 114. Additionally, the bonding material 117 may be selected for its ability to withstand various environmental conditions. According to one example, the components 112, 114 are made from a fiber-reinforced composite material and the bonding material 117 is an epoxy or a urethane adhesive. In another example, the components 112, 114 are made from metal materials and the bonding material 117 is a methacrylate adhesive. In other words, the components 112, 114 may be made from metallic, composite, or ceramic materials.

Figure 4:
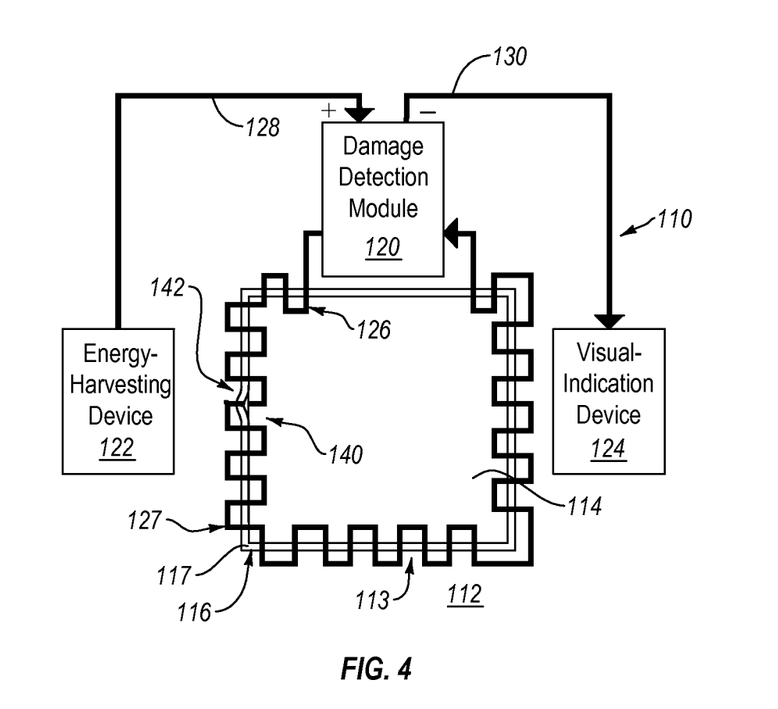
FIG. 4 depicts a top plan view of a system for monitoring structural health of bonded components, shown in a second state, according to one embodiment.
Figure 5:
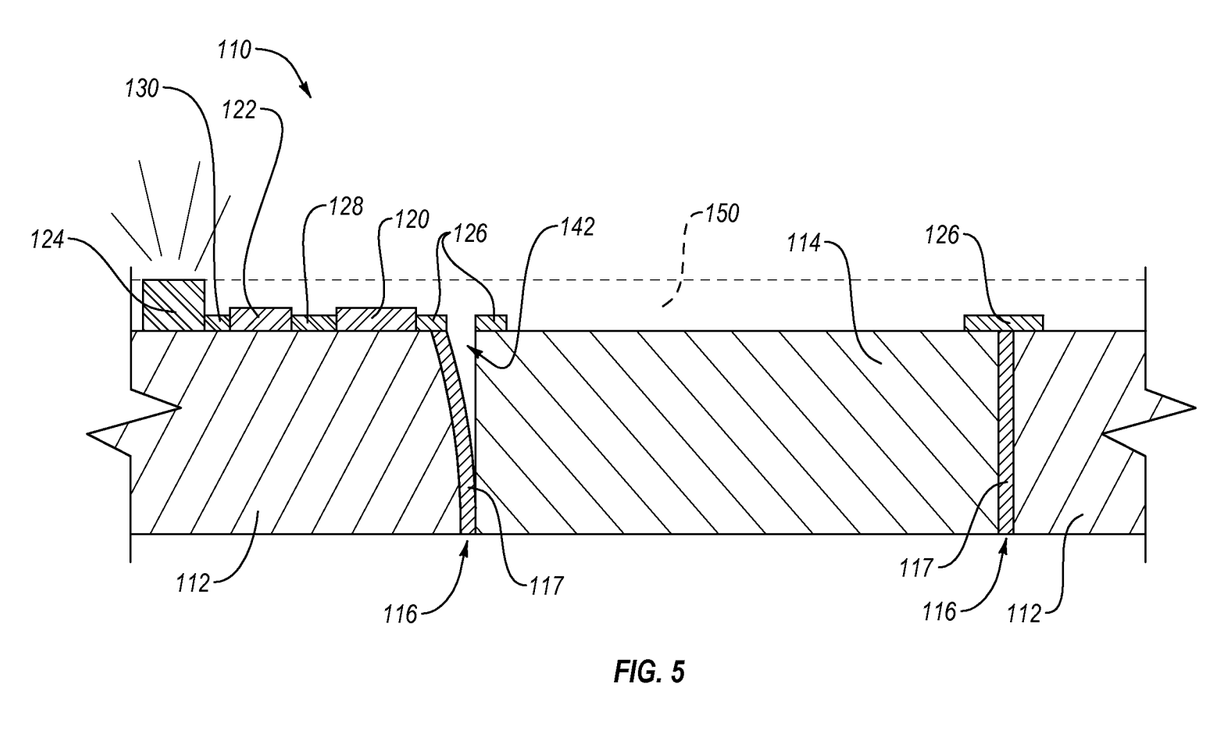
FIG. 5 depicts a cross-sectional side view of a system for monitoring structural health of bonded components, shown in a second state, according to one embodiment.

Whether the components are bonded together as a step in the original manufacture of a structure or bonded together to repair a damaged portion of a structure, over time, in certain operating conditions, the bond between the bonded components may breakdown. For example, the bonding material forming the bonded joint between bonded components may become debonded from one or more of the bonded components. Such a condition is known as delamination and results in the bonding material breaking away from one or more of the bonded components. Delamination occurs along the interface between bonded components or along an edge between bonded components, and results in either the bonding material separating from one or more of the bonded components, or one of the bonded components separating from at least one of the other of the bonded components. For example, referring to FIGS. 3 and 4, the bonding material 117 has delaminated or separated from the component 114, thus creating a separation zone or gap 142 between the bonding material and the component 114. Delamination or debonding of a bonded joint, such as shown in FIGS. 4 and 5, can have negative consequences on the performance and integrity of the bonded components, and thus the overall structure with which they form a part.

As mentioned above, the detection of a delaminated or debonded joint can be difficult. Typically, the detection of a delaminated or debonded joint requires close inspection, which is usually performed by manual observation.

Referring back to FIGS. 1 and 3, the system 110 for monitoring structural health of the bonded components 112, 114 of the aircraft 100 is configured to automatically detect delamination or debonding of a bonded joint between the bonded components, and provide an easily-identifiable visual indication responsive to the detection of a delaminated or debonded joint. In some implementations, the visual indication is a permanent indication, while in other implementations, the visual indication is a non-permanent indication.

According to the illustrated embodiment, the system 110 includes a power supply 125, which can be an electrical power supply. In one embodiment, the power supply 125 is power supplied by the aircraft. In an exemplary embodiment, the power supply 125 is an energy-harvesting device 122. The system 110 also includes a damage-detection module 120, a visual-indication device 124, and electrically-conductive ink 126. The electrically-conductive ink 126 is applied onto the bonded components 112, 114 and across the interface 116 between the bonded components to form a printed wire. Application of the electrically-conductive ink 126 can be accomplished in any of various methods, such as printing, spraying, brushing, stenciling, stamping, and the like. According to one embodiment, an ink jet or laser printer is used to print the electrically-conductive ink 126 directly onto the bonded components 112, 114 and across the interface 116 in a desirable pattern. The desirable pattern is selected according to, at least in part, a width of the electrically-conductive ink 126 and a desired surface area of the interface 116 to be covered by the electrically-conductive ink.

Generally, the desired pattern includes at least one pass of the electrically-conductive ink 126 across the interface 116. However, to increase the surface area of the interface 116 covered by the electrically-conductive ink 126, the desired pattern may include multiple passes of the electrically-conductive ink across the interface 116 about a periphery of the interface as shown in FIG. 1. In other words, the electrically-conductive ink 126 shown in FIG. 1 passes, switches back, or zig-zags across the interface 116 multiple times as it tracks the periphery of the interface. Accordingly, after a first pass across a first location of the interface 116 in a first direction, the electrically-conductive ink 126 switches direction and passes across the interface 116 at a second location in, spaced apart from the first location, and in a second direction, opposite the first direction. These switch-backs of the desired pattern of the electrically-conductive ink 126 can have any of various shapes and frequencies. In the illustrated embodiment of FIG. 1, and as an illustrative example only, the switch-backs have a non-rounded or square shape and occur at a frequency of about 8 switch-backs per side of the interface 116. In other embodiments, the switch-backs can have a rounded shape or other non-rounded shape (e.g., triangular) and occur at higher or lower frequencies than shown. Thus, the electrically conductive ink 126 may be shaped as a square wave, a sinusoidal wave, a triangular wave, or any other suitable pattern that may be overlaid onto the interface 116. Moreover, the amplitude and frequency of the conductive ink 126 may be predetermined based on a size of delamination desired to be detected. For example, increasing the quantity of switch-backs enables the system to identify smaller delaminations, etc.

Although the electrically-conductive ink 126 may follow any of various circuitous or non-circuitous patterns over the bonded components 112, 114 and across the interface 116, the electrically-conductive ink 126 applied onto the bonded components 112, 114 forms a continuous, non-interrupted, wire of ink. The electrically-conductive ink 126 is electrically coupled with the damage-detection module 120. More specifically, the electrically-conductive ink 126 forms an electrical circuit 127 with the damage-detection module 120. For example, a first end of the electrically-conductive ink 126 is electrically coupled with a positive side of the damage-detection module 120, as indicated, and a second end of the electrically-conductive ink 126 is electrically coupled with a negative side of the damage-detection module. The damage-detection module 120 is configured to communicate electrical energy, in the direction shown, through the electrical circuit 127 formed by the electrically-conductive ink 126 via the electrical coupling with the electrically-conductive ink at the positive and negative side of the damage-detection module.

The electrical energy communicated to the electrical circuit 127 by the damage-detection module 120 is received from the energy-harvesting device 122 via an electrical wire 128. The energy-harvesting device 122 is configured to harvest non-electrical or renewable energy and convert the non-electrical energy into electrical energy. The non-electrical energy can be kinetic energy in the form of vibrations. In such implementations, the energy-harvesting device 122 can be one or more piezoelectric generators configured to convert vibrational kinetic energy into electrical energy. Alternatively, or additionally, in some embodiments, the non-electrical energy is wind energy and the energy-harvesting device 122 is one or more turbines configured to convert wind energy into electrical energy. Alternatively, or additionally, in some embodiments, the non-electrical energy is solar energy and the energy-harvesting device 122 is one or more solar panels configured to convert solar energy into electrical energy. The electrical wire 128 can be any of various electrically-conductive wires, such as electrically-conductive ink, applied to the component 112 using any of various methods, such as printing. In some embodiments, the electrical wire 128 is formed in the same general manner as the electrically-conductive ink 126 of the electrical circuit 127.

Figure 2:
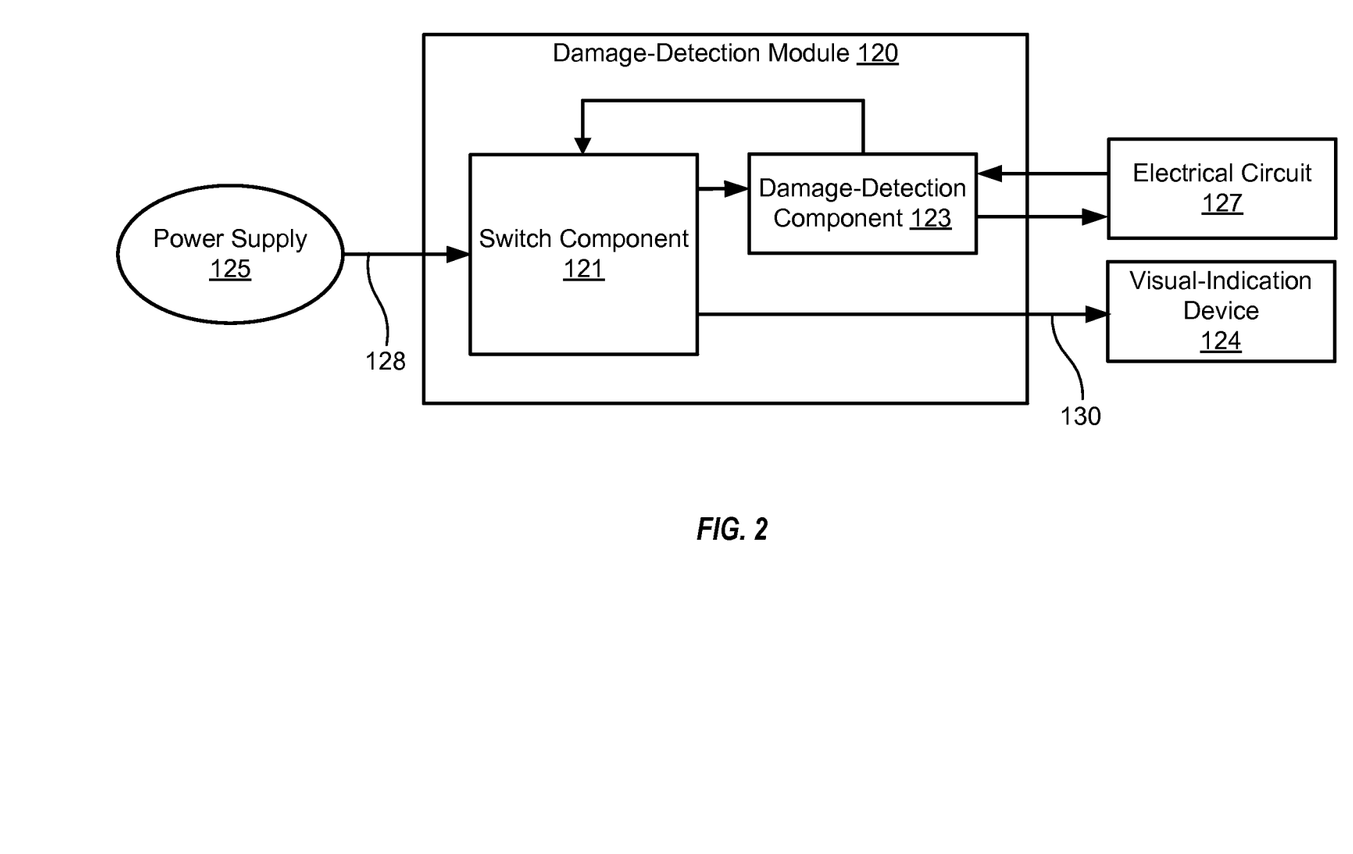
FIG. 2 depicts a schematic block diagram of a damage-detection module of the system of FIG. 1, according to one embodiment.

Referring to FIG. 2, the damage-detection module 120 includes a switch component 121 that is configured to communicate (e.g., transmit) the power supply 125 to one of the electrical circuit 127 or visual-indication device 124 responsive to whether a break is detected in the electrical circuit 127 by a damage-detection component 123. More specifically, the switch component 121 of the damage-detection module 120 communicates electrical energy to the electrical circuit 127, but does not communicate electrical energy to the visual-indication device 124, when no break in the electrical circuit 127 is detected by the damage-detection component 123, as indicated in FIG. 1. In contrast, the switch component 121 of the damage-detection module 120 communicates electrical energy to the visual-indication device 124 via an electrical wire 130 or line, but does not communicate electrical energy to the electrical circuit 127, when a break in the electrical circuit 127 is detected by the damage-detection component 123. The power supply 125 may be provided from an energy-harvesting device, such as the energy-harvesting device 122, or from another power supply onboard the aircraft 100, such as a battery, electrical energy generator, or the main power supply for the aircraft. Moreover, the power supply 125 communicates power to the switch component 121 via the electrical wire 128.

Referring to FIGS. 4 and 5, delamination of a bonded joint causes a break 140, which is a physical break, in the electrical circuit 127. Accordingly, delamination or damage to a bonded joint is detected by detecting a break in the electrical circuit 127. In the illustrated example, as the bonding material 117 separates, debonds, or delaminates from the component 114, a separation zone or gap 142 between the bonding material and the component is formed. With the electrically-conductive ink 126 applied onto the component 112, component 114, and bonding material 117, the separation between the bonding material and the component 114 causes the electrically-conductive ink 126 to separate from itself and form an open space or break 140 in the electrically-conductive ink 126. The break 140 in the electrically-conductive ink 126 prevents the passage of electrical energy through the electrical circuit 127, thus rendering open the circuit.

Generally, the damage-detection component 123 detects a break in the electrical circuit 127 by detecting an open circuit or short in the electrical circuit 127. Accordingly, the damage-detection component 123 can be any of various active or passive sensors configured to actively or passively detect an open circuit or a short in an open circuit. In some implementations, the damage-detection component 123 is a resistance sensor that monitors an electrical resistance in an electrical circuit powered by electrical energy and detects an open circuit or short in the electrical circuit when the resistance being monitored asymptotically approaches infinity. According to certain implementations, the damage-detection component 123 may include logic for determining a short-circuit status of the electrical circuit 127. Because an open or short circuit indicates a break in the electrical circuit, which occurs when delamination of a bonded joint is present, the detection of an open or short circuit is indicative of delamination of a bonded joint.

Again, referring to FIGS. 4 and 5, after the damage-detection component 123 detects a short in the electrical circuit 127, the damage-detection component 123 communicates the short-circuit status of the electrical circuit to the switch component 121, which, in response, switches the communication of electrical energy from the electrical circuit 127 to the visual-indication device 124 as indicated in FIG. 4. The electrical energy is communicated to the visual-indication device 124 via an electrical wire 130. The electrical wire 130 can be any of various electrically-conductive wires, such as electrically-conductive ink, applied to the component 112 using any of various methods, such as printing. In some embodiments, the electrical wire 130 is formed in the same general manner as the electrically-conductive ink 126 of the electrical circuit 127. The short-circuit status of the electrical circuit 127 can be communicated to the switch component 121 electrically, such as via electrical communication or power signals, or mechanically, such as via an actuation device.

The switch component 121 can be any of various electrical devices configured to switch the communication of electrical energy from one circuit to another circuit responsive to a short-circuit status input from the damage-detection component 123. According to one embodiment, the switch component 121 is a passive or mechanical switch actuatable by a mechanical communication of the short-circuit status of the electrical circuit 127 from the damage-detection component 123. In yet another embodiment, the switch component 121 is an electrical switch operable by an electrical communication of the short-circuit status of the electrical circuit 127 from the damage-detection component 123. The switch component 121 may comprises at least one electrical transistor or other logic device. It is recognized that although the switch component 121 and damage-detection component 123 are shown in FIG. 2 as being separate components, in some embodiments, the switch component 121 and damage-detection component 123 can be integrated into or form the same component.

Referring again to FIGS. 4 and 5, in response to the receipt of electrical energy from the damage-detection module 120, which is provided by the energy-harvesting device 122, the visual-indication device 124 visually indicates damage to (e.g., delamination of) the bonded joint between the bonded components 112, 114. As mentioned above, the visual-indication device 124 can provide a permanent or non-reversible visual indication to a user, or a non-permanent or reversible visual indication to a user. Whether permanent or non-permanent, the visual indication provided by the visual-indication device 124 is readily discernable by a user without close inspection of the bonded joint. In some implementations, the visual-indication device 124 is remote, separate, or spaced-apart from the electrical circuit 127 and provides a separate and more easily discernable method of observing structural health of bonded components than visual inspection of the bonded components or visual inspection of the electrical circuit 127. In fact, in certain implementations, the electrical circuit 127 is covered by at least one outer layer 150, and the visual-indication device 124 is not covered by the at least one outer layer 150, such that the electrical circuit 127 is not visible to a user, but the visual-indication device 124 is visible to the user.

According to some embodiments, the visual-indication device 124 is a thermochromic marker, or similar device, that provides a permanent visual indicator upon receipt of electrical energy. More specifically, the electrical energy received by the thermochromic marker increases the temperature of the thermochromic, which causes the marker to permanently change color. In this manner, the user is notified of damage to a bonded joint by visually observing the changed color of the thermochromic marker. Once changed, the color of the thermochromic marker remains changed even when electrical energy from the energy-harvesting device 122 is not being received, such as when the aircraft 100 is stationary. According to one alternative implementation, the changed color of the thermochromic marker, or other permanent visual indicator, may be visible only in non-ambient lighting conditions. For example, the thermochromic marker may change to a fluorescent color upon receipt of electrical energy, which is visible due to fluorescence, only in black-light lighting conditions or when a black light is shown on the marker.

In yet other embodiments, the visual-indication device 124 is a light (e.g., LED), or other similar device, that provides a non-permanent visual indicator (e.g., illumination) upon receipt of electrical energy. In this manner, the user is notified of damage to a bonded joint by visually observing the illumination of the light. In contrast to a permanent visual indicator, such as the thermochromic marker, once electrical energy from the energy-harvesting device 122 is not being received by the light, the light ceases to illuminate. However, in some implementations, the system 110 may include an electrical energy storage component (e.g., battery) that stores at least some energy harvested by the energy-harvesting device 122. Non-permanent visual indicators, such as lights, may continue to illuminate to indicate damage to a bonded joint by using energy stored in the electrical energy storage component even after the energy-harvesting device 122 stops generating electrical energy.

According to another embodiment, the visual-indication device 124 may be a transmitter that sends wireless or wired electronic communication signals to a remote location, such as a monitoring center or a cockpit of an aircraft. Upon receipt of such electronic communication signals, the remote location may have visual indicators, such as lights, displays, gauges, and the like, that provide a visual indication of damage to a bonded joint.

The damage-detection module 120, energy-harvesting device 122, and visual-indication device 124 are affixed to at least one of the bonded components 112, 114 in some embodiments. The damage-detection module 120, energy-harvesting device 122, and visual-indication device 124 can be affixed to at least one of the bonded components 112, 114 using any of various fixation methods, such as adhesion, fastening, welding, and the like. Based on the fixation method, the damage-detection module 120, energy-harvesting device 122, and visual-indication device 124 can be permanently coupled or affixed to the bonded components 112, 114. Alternatively, the damage-detection module 120, energy-harvesting device 122, and visual-indication device 124 can be non-permanently or removably coupled or affixed to the bonded components 112, 114.

After being affixed to the bonded components 112, 114, at least the damage-detection module 120 and energy-harvesting device 122 can be covered by at least one outer layer 150, which can be a paint layer, sealant layer, and the like. The at least one outer layer 150 may entirely cover the damage-detection module 120 and energy-harvesting device 122 so as to render non-visible the damage-detection module 120 and energy-harvesting device 122. Along with the damage-detection module 120 and energy-harvesting device 122, the at least one outer layer 150 may also cover the components 112, 114, interface 116, electrical circuit 127, electrical wire 128, and electrical wire 130. As mentioned above, the at least one outer layer 150 may at least partially cover the visual-indication device 124 when the visual-indication device 124 provides a visual indication in place on the aircraft 100, or completely cover the visual-indication device 124 when the visual-indication device 124 is used to communicate damage information to a remote location that provides a visual indication.

The damage-detection module 120, energy-harvesting device 122, and visual-indication device 124 can be affixed or mounted onto a completed or fully-assembled component. Alternatively, the damage-detection module 120, energy-harvesting device 122, and visual-indication device 124 can be integrated (e.g., embedded) into a component during the manufacturing or assembly of the component.

The damage-detection module 120, energy-harvesting device 122, and visual-indication device 124 can be micro-sized or nano-sized components. Moreover, the electrical energy required to power and operate the damage-detection module 120 and visual-indication device 124 is minimal. Accordingly, the energy-harvesting device 122 need be configured to harvest only minimal amounts of electrical energy for operating the damage-detection module 120 and visual-indication device 124.

Figure 6:
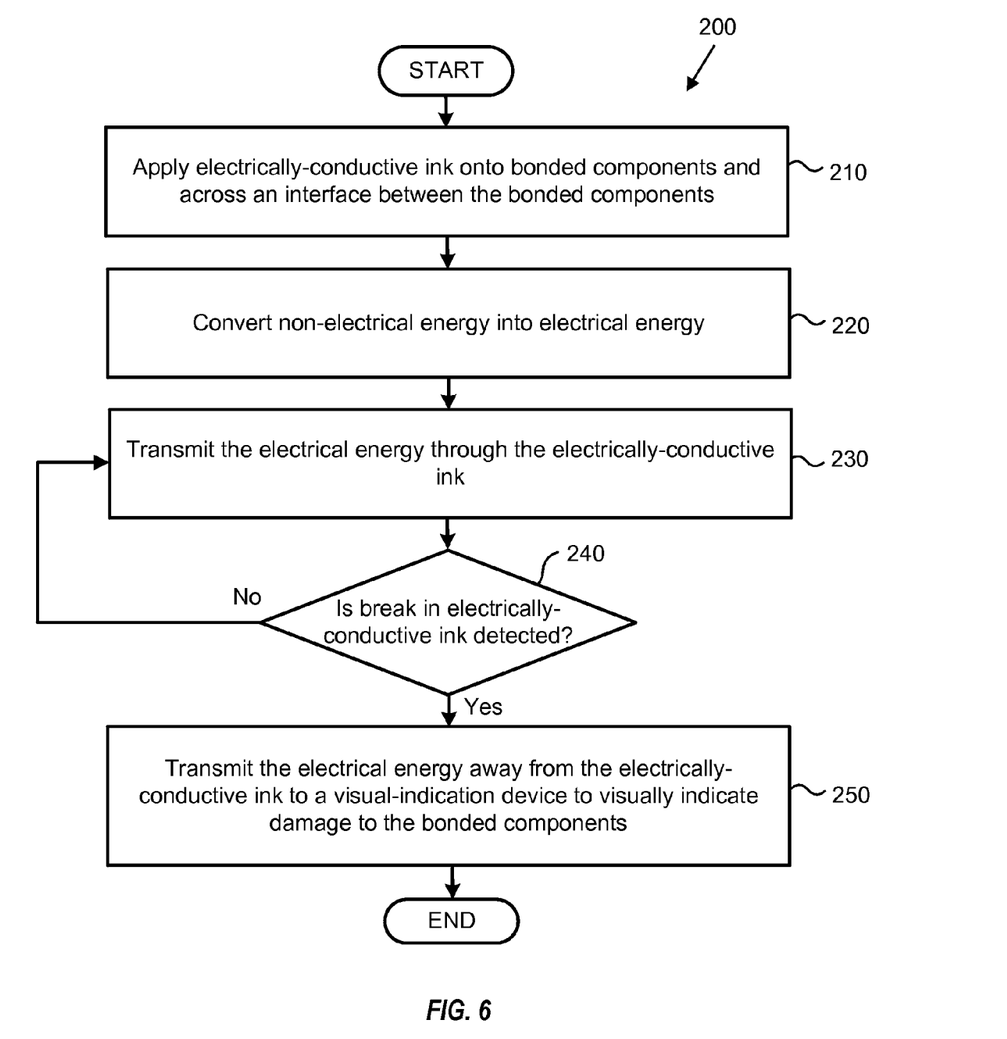
FIG. 6 is a schematic flowchart diagram of one embodiment of a method of monitoring structural health of bonded components.

Referring to FIG. 6, a method 200 of monitoring structural health of bonded components, which summarizes the method of monitoring structural health of bonded components described in more detail above, is shown. The method 200 includes applying electrically-conductive ink onto bonded components and across an interface between the bonded components at 210. Further, the method 200 includes converting non-electrical energy into electrical energy at 220. The non-electrical energy can be harvested using an energy-harvesting device. Additionally, the method 200 includes transmitting the electrical energy through the electrically-conductive ink at 230. The method 200 monitors the electrically-conductive for a break in the electrically-conductive ink. A break in the electrically-conductive ink occurs when a short circuit or open circuit in an electrical circuit, formed by the electrically-conductive ink, is detected. If a break in the electrically-conductive ink is detected at 240, the method 200 transmits the electrical energy away from the electrically-conductive ink to a visual-indication device to visually indicate damage to (e.g., delamination of) the bonded components. The visual indication is permanent in some implementations. If a break in the electrically-conductive ink is not detected at 240, then the method 200 continues to transmit the electrical energy through the electrically-conductive ink at 230.

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive.

What is claimed is:

1. A system for monitoring structural health of bonded components, the system comprising:
   a damage-detection module powered by electrical energy from an energy-harvesting device;
   bonded components, comprising a first bonded component and a second bonded component, wherein:
   the first bonded component and the second bonded component each comprises a contact surface;
   the first bonded component and the second bonded component are bonded at the contact surfaces by a bonding material;
   the contact surfaces face each other; and the first bonded component and the second bonded component comprise non-contact surfaces that do not face each other and are not bonded to each other;

electrically-conductive ink applied onto the bonded components at the non-contact surfaces and traversing back and forth between the bonded components on the non-contact surfaces, the electrically-conductive ink forming an electrical circuit with the damage-detection module; and a visual-indication device electrically coupled to the damage-detection module, the visual-indication device configured to visually indicate damage to the bonded components in response to receipt of electrical energy;

wherein the damage-detection module is configured to detect a break in the electrically-conductive ink and to transmit electrical energy from the energy-harvesting device to the visual-indication device in response to detecting the break in the electrically-conductive ink.

2. The system according to claim 1, wherein the energy-harvesting device, damage-detection module, and visual-indication device are affixed to at least one of the bonded components.

3. The system according to claim 1, wherein the energy-harvesting device, damage-detection module, and visual-indication device are integrated into at least one of the bonded components.

4. The system according to claim 1, wherein the energy-harvesting device, damage-detection module, and visual-indication device are permanently coupled to at least one of the bonded components.

5. The system according to claim 1, wherein the non-electrical energy comprises kinetic energy.

6. The system according to claim 5, wherein the energy-harvesting device comprises a piezoelectric generator.

7. The system according to claim 1, wherein the visual-indication device generates a permanent visual indication of damage to the bonded components.

8. The system according to claim 7, wherein the visual-indication device comprises a thermochromic marker.

9. The system according to claim 1, wherein the damage-detection module comprises a switch component configured to transmit electrical energy from the energy-harvesting device to only the electrically-conductive ink when a break in the electrically-conductive ink is not detected and to transmit electrical energy from the energy-harvesting device to only the visual-indication device when a break in the electrically-conductive ink is detected.

10. The system according to claim 9, wherein the switch component comprises a passive switch component.

11. The system according to claim 9, wherein the switch component comprises a transistor.

12. The system according to claim 1, wherein a visual indication of damage to the bonded components provided by the visual-indication device is visible only in black-light lighting conditions.

13. The system according to claim 1, wherein the interface comprises a bonding material.

14. The system according to claim 1, wherein the electrically-conductive ink follows a pattern comprising multiple passes across the interface about a periphery of the interface.

15. A method of monitoring structural health of bonded components, the method comprising:

applying electrically-conductive ink onto bonded components at non-contact surfaces and traversing back and forth between the bonded components on the non-contact surfaces to form an electrical circuit, wherein:

the bonded components comprise a first bonded component and a second bonded component;

the first bonded component and the second bonded component each comprises a contact surface;

the first bonded component and the second bonded component are bonded at the contact surfaces by a bonding material;

the contact surfaces face each other;

the first bonded component and the second bonded component comprise non-contact surfaces; and the non-contact surfaces do not face each other and are not bonded to each other;

converting non-electrical energy into electrical energy;

transmitting the electrical energy through the electrical circuit;

detecting a break in the electrically-conductive ink; and visually indicating a break in the electrically-conductive ink on a visual-indication device, powered by the electrical energy, in response to a break in the electrically-conductive ink being detected.

16. The method according to claim 15, wherein applying the electrically-conductive ink onto the bonded components and across the interface between the bonded components to form the electrical circuit comprises applying multiple passes of electrically-conductive ink across the interface about a periphery of the interface.

17. The method according to claim 16, wherein applying multiple passes of electrically-conductive ink comprises applying multiple passes each having at least one of a square, triangular, or sinusoidal shape.

18. The method according to claim 15, wherein converting non-electrical energy into electrical energy comprises converting kinetic energy into electrical energy using at least one piezoelectric generator.

19. A structure, comprising:

a substrate comprising a damaged portion;

a patch applied to the damaged portion of the substrate, wherein an interface is defined between the substrate and the patch, wherein the patch and substrate are bonded at contact surfaces that face each other, wherein the patch and substrate comprise non-contact surfaces that do not face each other and are not bonded to each other;

an energy-harvesting device affixed to the substrate and configured to convert non-electrical energy into electrical energy;

a damage-detection module affixed to the substrate and powered by electrical energy from the energy-harvesting device;

electrically-conductive ink applied onto the substrate and onto the patch at the non-contact surfaces and traversing back and forth between the patch and the substrate, the electrically-conductive ink forming an electrical circuit with the damage-detection module; and a visual-indication device electrically coupled with the damage-detection module and spaced away from the electrically-conductive ink, the visual-indication device configured to visually indicate damage to the interface in response to receipt of electrical energy;

wherein the damage-detection module is configured to detect a break in the electrically-conductive ink and to transmit electrical energy from the energy-harvesting device to the visual-indication device in response to detecting the break in the electrically-conductive ink.

* * * * *